(12) United States Patent
DeBruin et al.

(10) Patent No.: US 7,872,090 B2
(45) Date of Patent: Jan. 18, 2011

(54) REACTOR SYSTEM WITH OPTIMIZED HEATING AND PHASE SEPARATION

(75) Inventors: Bruce Roger DeBruin, Lexington, SC (US); Thomas Lloyd Yount, Kingsport, TN (US); Larry Cates Windes, Kingsport, TN (US); Wesley Thomas Moyer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 596 days.

(21) Appl. No.: 11/776,603

(22) Filed: Jul. 12, 2007

(65) Prior Publication Data

US 2009/0018284 A1 Jan. 15, 2009

(51) Int. Cl.
*C08G 63/02* (2006.01)
*C08G 63/00* (2006.01)

(52) U.S. Cl. .................. 528/271; 422/129; 422/131; 422/137; 422/138; 526/64; 528/171; 528/176; 528/272

(58) Field of Classification Search ................ 422/129, 422/131, 137, 138; 526/64; 528/171, 176, 528/271, 272, 308.1
See application file for complete search history.

(56) References Cited

U.S. PATENT DOCUMENTS

| | | | |
|---|---|---|---|
| 1,422,182 | A | 7/1922 | Curme |
| 2,361,717 | A | 10/1944 | Taylor |
| 2,614,648 | A | 10/1952 | Wilson |
| 2,709,642 | A | 5/1955 | Mann, Jr. et al. |
| 2,727,882 | A | 12/1955 | Vodonik |
| 2,753,249 | A | 7/1956 | Idenden et al. |
| 2,820,815 | A | 1/1958 | Matuszak et al. |
| 2,829,153 | A | 4/1958 | Vodonik |
| 2,905,707 | A | 9/1959 | Hurt et al. |
| 2,973,341 | A | 2/1961 | Hippe et al. |
| 3,044,993 | A | 7/1962 | Tiemersma |
| 3,052,711 | A | 9/1962 | Glogau et al. |
| 3,054,776 | A | 9/1962 | Higgins |
| 3,110,547 | A | 11/1963 | Emmert |
| 3,113,843 | A | 12/1963 | Li |
| 3,161,710 | A | 12/1964 | Turner |
| 3,174,830 | A | 3/1965 | Watzl et al. |
| 3,185,668 | A | 5/1965 | Meyer et al. |
| 3,192,184 | A | 6/1965 | Brill et al. |
| 3,241,926 | A | 3/1966 | Parker et al. |
| 3,250,747 | A | 5/1966 | Mitchell, Jr. et al. |
| 3,251,657 | A | 5/1966 | Bachmann et al. |
| 3,254,965 | A | 6/1966 | Ogle |
| 3,376,353 | A | 4/1968 | Tate |
| 3,385,881 | A | 5/1968 | Bachmann et al. |
| 3,390,965 | A | 7/1968 | Ditmar |
| 3,402,023 | A | 9/1968 | Dobo |
| 3,427,287 | A | 2/1969 | Pengilly |
| 3,438,942 | A | 4/1969 | Scheller |
| 3,442,868 | A | 5/1969 | Ogata et al. |
| 3,458,467 | A | 7/1969 | Herrie et al. |
| 3,468,849 | A | 9/1969 | Rothert |
| 3,480,587 | A | 11/1969 | Porter |
| 3,487,049 | A | 12/1969 | Busot |
| 3,496,146 | A | 2/1970 | Mellichamp, Jr. |
| 3,496,159 | A | 2/1970 | Spence |
| 3,496,220 | A | 2/1970 | McCarty et al. |
| 3,497,473 | A | 2/1970 | Kemkes |
| 3,507,905 | A | 4/1970 | Girantet et al. |
| 3,509,203 | A | 4/1970 | Michaelis et al. |
| 3,511,615 | A | 5/1970 | Roget et al. |
| 3,522,214 | A | 7/1970 | Crawford et al. |
| 3,534,082 | A | 10/1970 | Armstrong et al. |
| 3,551,396 | A | 12/1970 | Lanthier |
| 3,582,244 | A | 6/1971 | Siclari et al. |
| 3,590,070 | A | 6/1971 | Martin et al. |
| 3,590,072 | A | 6/1971 | Leybourne |
| 3,595,846 | A | 7/1971 | Rouzier |
| 3,600,137 | A | 8/1971 | Girantet et al. |
| 3,609,125 | A | 9/1971 | Fujimoto et al. |
| 3,639,448 | A | 2/1972 | Matsuzawa et al. |
| 3,644,096 | A | 2/1972 | Lewis et al. |
| 3,644,294 | A | 2/1972 | Siclari et al. |
| 3,644,483 | A | 2/1972 | Griehl et al. |
| 3,646,102 | A | 2/1972 | Kobayashi et al. |
| 3,647,758 | A | 3/1972 | Ryffel et al. |
| 3,651,125 | A | 3/1972 | Lewis et al. |
| 3,676,485 | A | 7/1972 | Lewis et al. |
| 3,684,459 | A | 8/1972 | Tate et al. |

(Continued)

FOREIGN PATENT DOCUMENTS

BE   780142   3/1972

(Continued)

OTHER PUBLICATIONS

Copending U.S. Appl. No. 11/506,105, filed Aug. 17, 2006, Bruce Roger DeBruin.

(Continued)

*Primary Examiner*—Terressa M Boykin
(74) *Attorney, Agent, or Firm*—Jennifer R. Knight; Bernard J. Graves, Jr.

(57) ABSTRACT

A reactor system operable to facilitate a chemical reaction in a reaction medium flowing therethrough. The reactor system includes a heat exchanger for heating the reaction medium and a disengagement vessel for disengaging vapor from the heated reaction medium.

52 Claims, 1 Drawing Sheet

U.S. PATENT DOCUMENTS

| | | |
|---|---|---|
| 3,689,461 A | 9/1972 | Balint et al. |
| 3,697,579 A | 10/1972 | Balint et al. |
| 3,723,391 A | 3/1973 | Beer et al. |
| 3,740,267 A | 6/1973 | Haylock et al. |
| 3,781,213 A | 12/1973 | Siclari et al. |
| 3,787,479 A | 1/1974 | Grehl et al. |
| 3,819,585 A | 6/1974 | Funk et al. |
| 3,841,836 A | 10/1974 | Lunsford et al. |
| 3,849,379 A | 11/1974 | Jeurissen et al. |
| 3,867,349 A | 2/1975 | Heeg et al. |
| 3,892,798 A | 7/1975 | Heeg et al. |
| 3,927,982 A | 12/1975 | Chapman et al. |
| 3,927,983 A | 12/1975 | Gordon et al. |
| 3,960,820 A | 6/1976 | Pinney |
| 3,988,301 A | 10/1976 | Jeurissen et al. |
| 4,001,187 A | 1/1977 | Itabashi et al. |
| 4,008,048 A | 2/1977 | Hellemans et al. |
| 4,019,866 A | 4/1977 | Jaswal et al. |
| 4,020,049 A | 4/1977 | Rinehart |
| 4,028,307 A | 6/1977 | Ure |
| 4,032,563 A | 6/1977 | Harper et al. |
| 4,039,515 A | 8/1977 | Rebhan et al. |
| 4,046,718 A | 9/1977 | Mass et al. |
| 4,049,638 A | 9/1977 | Doerfel et al. |
| 4,056,514 A | 11/1977 | Strehler et al. |
| 4,064,112 A | 12/1977 | Rothe et al. |
| 4,077,945 A | 3/1978 | Heinze et al. |
| 4,079,046 A | 3/1978 | Brignac et al. |
| 4,089,888 A | 5/1978 | Tokumitsu et al. |
| 4,097,468 A | 6/1978 | James et al. |
| 4,100,142 A | 7/1978 | Schaefer et al. |
| 4,110,316 A | 8/1978 | Edging et al. |
| 4,118,582 A | 10/1978 | Walker |
| 4,122,112 A | 10/1978 | Koda et al. |
| 4,146,729 A | 3/1979 | Goodley et al. |
| 4,148,693 A | 4/1979 | Williamson |
| 4,196,168 A | 4/1980 | Lewis |
| 4,200,145 A | 4/1980 | Underwood |
| 4,204,070 A | 5/1980 | Suzuki et al. |
| 4,212,963 A | 7/1980 | Lehr et al. |
| 4,223,124 A | 9/1980 | Broughton et al. |
| 4,230,818 A | 10/1980 | Broughton, Jr. et al. |
| 4,235,844 A | 11/1980 | Sterzel et al. |
| 4,238,593 A | 12/1980 | Duh |
| 4,254,246 A | 3/1981 | Dicoi et al. |
| 4,289,871 A | 9/1981 | Rowan et al. |
| 4,289,895 A | 9/1981 | Burkhardt et al. |
| 4,339,570 A | 7/1982 | Muschelknautz et al. |
| 4,346,193 A | 8/1982 | Warfel |
| 4,361,462 A | 11/1982 | Fujii et al. |
| 4,365,078 A | 12/1982 | Shelley |
| 4,382,139 A | 5/1983 | Kapteina et al. |
| 4,383,093 A | 5/1983 | Shiraki et al. |
| 4,410,750 A | 10/1983 | Langer, Jr. |
| 4,424,301 A | 1/1984 | Klippert et al. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,529,787 A | 7/1985 | Schmidt et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,554,343 A | 11/1985 | Jackson, Jr. et al. |
| 4,555,384 A | 11/1985 | Morris et al. |
| 4,588,560 A | 5/1986 | Degnan et al. |
| 4,612,363 A | 9/1986 | Sasaki et al. |
| 4,670,580 A | 6/1987 | Maurer |
| 4,675,377 A | 6/1987 | Mobley et al. |
| 4,680,345 A | 7/1987 | Kobayashi et al. |
| 4,680,376 A | 7/1987 | Heinze et al. |
| 4,721,575 A | 1/1988 | Binning et al. |
| 4,952,302 A | 8/1990 | Leach |
| 4,952,627 A | 8/1990 | Morita et al. |
| 4,973,655 A | 11/1990 | Pipper et al. |
| 5,002,116 A | 3/1991 | Hoagland et al. |
| 5,037,955 A | 8/1991 | Dighton |
| 5,041,525 A | 8/1991 | Jackson |
| 5,064,935 A | 11/1991 | Jackson et al. |
| 5,110,325 A | 5/1992 | Lerner |
| 5,162,488 A | 11/1992 | Mason |
| 5,185,426 A | 2/1993 | Verheijen et al. |
| 5,194,525 A | 3/1993 | Miura et al. |
| 5,202,463 A | 4/1993 | Ruszkay |
| 5,236,558 A | 8/1993 | Buyalos et al. |
| 5,243,022 A | 9/1993 | Kim et al. |
| 5,245,057 A | 9/1993 | Shirtum |
| 5,254,288 A | 10/1993 | Verheijen et al. |
| 5,294,305 A | 3/1994 | Craft, Sr. et al. |
| 5,300,626 A | 4/1994 | Jehl et al. |
| 5,324,853 A | 6/1994 | Jones et al. |
| 5,340,906 A | 8/1994 | Shirokura et al. |
| 5,340,907 A | 8/1994 | Yau et al. |
| 5,384,389 A | 1/1995 | Alewelt et al. |
| 5,385,773 A | 1/1995 | Yau et al. |
| 5,413,861 A | 5/1995 | Gallo |
| 5,434,239 A | 7/1995 | Bhatia |
| 5,464,590 A | 11/1995 | Yount et al. |
| 5,466,419 A | 11/1995 | Yount et al. |
| 5,466,765 A | 11/1995 | Haseltine et al. |
| 5,466,776 A | 11/1995 | Krautstrunk et al. |
| 5,476,919 A | 12/1995 | Schaeffer |
| 5,478,909 A | 12/1995 | Jehl et al. |
| 5,480,616 A | 1/1996 | Richardson et al. |
| 5,484,882 A | 1/1996 | Takada et al. |
| 5,496,469 A | 3/1996 | Scraggs et al. |
| 5,519,112 A | 5/1996 | Harazoe et al. |
| 5,536,856 A | 7/1996 | Harrison et al. |
| 5,573,820 A | 11/1996 | Harazoe et al. |
| 5,594,077 A | 1/1997 | Groth et al. |
| 5,599,900 A | 2/1997 | Bhatia |
| 5,602,216 A | 2/1997 | Juvet |
| 5,648,437 A | 7/1997 | Fischer et al. |
| 5,650,536 A | 7/1997 | Dankworth et al. |
| 5,681,918 A | 10/1997 | Adams et al. |
| 5,688,898 A | 11/1997 | Bhatia |
| 5,739,219 A | 4/1998 | Fischer et al. |
| 5,750,079 A | 5/1998 | Ueda et al. |
| 5,753,190 A | 5/1998 | Haseltine et al. |
| 5,753,784 A | 5/1998 | Fischer et al. |
| 5,786,443 A | 7/1998 | Lowe |
| 5,811,496 A | 9/1998 | Iwasyk et al. |
| 5,816,700 A | 10/1998 | Starke, Sr. et al. |
| 5,830,981 A | 11/1998 | Koreishi et al. |
| 5,849,849 A | 12/1998 | Bhatia |
| 5,889,127 A | 3/1999 | Iiyama et al. |
| 5,898,058 A | 4/1999 | Nichols et al. |
| 5,902,865 A | 5/1999 | Gausepohl et al. |
| 5,905,096 A | 5/1999 | Lay et al. |
| 5,922,828 A | 7/1999 | Schiraldi |
| 5,932,105 A | 8/1999 | Kelly |
| 6,069,228 A | 5/2000 | Alsop et al. |
| 6,096,838 A | 8/2000 | Nakamoto et al. |
| 6,100,369 A | 8/2000 | Miyajima et al. |
| 6,103,859 A | 8/2000 | Jernigan et al. |
| 6,111,035 A | 8/2000 | Sakamoto et al. |
| 6,111,064 A | 8/2000 | Maurer et al. |
| 6,113,997 A | 9/2000 | Massey et al. |
| 6,127,493 A | 10/2000 | Maurer et al. |
| 6,174,970 B1 | 1/2001 | Braune |
| 6,252,034 B1 | 6/2001 | Uenishi et al. |
| 6,339,031 B1 | 1/2002 | Tan |

| | | | | | | |
|---|---|---|---|---|---|---|
| 6,355,738 | B2 | 3/2002 | Nakamachi | GB | 2010294 | 6/1979 |
| 6,359,106 | B1 | 3/2002 | Nakamoto et al. | GB | 2020194 | 11/1979 |
| 6,399,031 | B1 | 6/2002 | Herrmann et al. | GB | 2 052 535 | 1/1981 |
| 6,458,916 | B1 | 10/2002 | Yamaguchi et al. | GB | 2052535 | 1/1981 |
| 6,545,176 | B1 | 4/2003 | Tsay et al. | JP | 42 4993 B | 3/1967 |
| 6,551,517 | B1 | 4/2003 | Sentagnes et al. | JP | 42 18353 B | 9/1967 |
| 6,576,774 | B2 | 6/2003 | Scardino et al. | JP | 47 39043 A | 4/1971 |
| 6,590,062 | B2 | 7/2003 | Yamaguchi et al. | JP | 48 94795 A | 12/1973 |
| 6,623,643 | B2 | 9/2003 | Chisholm et al. | JP | 49 28698 A | 3/1974 |
| 6,631,892 | B1 | 10/2003 | Erickson | JP | 49 34593 A | 3/1974 |
| 6,642,407 | B2 | 11/2003 | Rao et al. | JP | 49 105893 A | 10/1974 |
| 6,703,454 | B2 | 3/2004 | Debruin | JP | 50 82197 A | 7/1975 |
| 6,723,826 | B2 | 4/2004 | Yamaguchi et al. | JP | 51 29460 A | 3/1976 |
| 6,814,944 | B1 | 11/2004 | Matsui et al. | JP | 51 100036 A | 9/1976 |
| 6,815,525 | B2 | 11/2004 | Debruin | JP | 51 136788 A | 11/1976 |
| 6,861,494 | B2 | 3/2005 | Debruin | JP | 51 136789 A | 11/1976 |
| 6,906,164 | B2 | 6/2005 | Debruin | JP | 52 51495 A | 4/1977 |
| 6,916,939 | B2 | 7/2005 | Yamane et al. | JP | 52 71432 A | 6/1977 |
| 7,008,546 | B2 | 3/2006 | Edmondson | JP | 52 78845 A | 7/1977 |
| 7,049,462 | B2 | 5/2006 | Nagare et al. | JP | 52 83424 A | 7/1977 |
| 7,074,879 | B2 | 7/2006 | Debruin et al. | JP | 52 87133 A | 7/1977 |
| 7,658,817 | B2 | 2/2010 | Fukuoka et al. | JP | 53 31793 A | 3/1978 |
| 2002/0128399 | A1 | 9/2002 | Nakamoto et al. | JP | 53 34894 A | 3/1978 |
| 2002/0161166 | A1 | 10/2002 | Nakane et al. | JP | 54 41833 A | 4/1979 |
| 2002/0180099 | A1 | 12/2002 | Keillor, III | JP | 54 76535 A | 6/1979 |
| 2003/0037910 | A1 | 2/2003 | Smymov | JP | 54 79242 A | 6/1979 |
| 2003/0104203 | A1 | 6/2003 | Tam et al. | JP | 54 100494 A | 8/1979 |
| 2003/0133856 | A1 | 7/2003 | Le | JP | 54 157536 A | 12/1979 |
| 2003/0191326 | A1 | 10/2003 | Yamane et al. | JP | 55 43128 A | 3/1980 |
| 2004/0068070 | A1 | 4/2004 | Martan et al. | JP | 55 108422 A | 8/1980 |
| 2004/0197618 | A1 | 10/2004 | Harada et al. | JP | 55 135133 A | 10/1980 |
| 2004/0249111 | A1 | 12/2004 | Debruin | JP | 58 129020 A | 8/1983 |
| 2005/0059782 | A1 | 3/2005 | Andrist et al. | JP | 59 47226 A | 3/1984 |
| 2005/0222371 | A1 | 10/2005 | Wilhelm et al. | JP | 59 53530 A | 3/1984 |
| 2006/0008661 | A1 | 1/2006 | Wijesundara et al. | JP | 59 68326 A | 4/1984 |
| 2006/0251546 | A1 | 11/2006 | Yount et al. | JP | 59 71326 A | 4/1984 |
| 2006/0251547 | A1 | 11/2006 | Windes et al. | JP | 60 15421 A | 1/1985 |
| 2007/0037959 | A1 | 2/2007 | DeBruin | JP | 60 72845 A | 4/1985 |
| 2008/0139760 | A1 | 6/2008 | DeBruin | JP | 60 115551 A | 6/1985 |
| 2008/0221296 | A1* | 9/2008 | DeBruin ............... 528/272 | JP | 60 120839 A | 6/1985 |
| | | | | JP | 60 163918 A | 8/1985 |
| | | FOREIGN PATENT DOCUMENTS | | JP | 60 226846 A | 11/1985 |
| BR | | 7906279 | 7/1981 | JP | 62 207325 A | 9/1987 |
| DE | | 2200832 | 1/1972 | JP | 62 292831 A | 12/1987 |
| DE | | 125 798 | 5/1977 | JP | 64 56726 A | 3/1989 |
| DE | | 126 073 | 6/1977 | JP | 1 102044 A | 4/1989 |
| DE | | 146 298 | 2/1981 | JP | 3 192118 A | 8/1991 |
| DE | | 206 558 | 2/1984 | JP | 3 292323 A | 12/1991 |
| DE | | 229 415 | 11/1985 | JP | 5-78402 | 3/1993 |
| DE | | 4235785 | 5/1994 | JP | 5 155994 A | 6/1993 |
| DE | | 195 25 579 | 12/1996 | JP | 6 247899 A | 9/1994 |
| DE | | 195 37 930 | 4/1997 | JP | 7 118208 A | 5/1995 |
| DE | | 103 36 164 A1 | 3/2005 | JP | 7 173268 A | 7/1995 |
| DE | | 10 2004 038 466 | 10/2005 | JP | 7 238151 A | 9/1995 |
| DE | | 10 2004 034 708 A1 | 2/2006 | JP | 7 313 865 | 12/1995 |
| EP | | 0 070 707 A1 | 1/1983 | JP | 8 198960 A | 8/1996 |
| EP | | 0 105 111 | 7/1983 | JP | 8 283398 A | 10/1996 |
| EP | | 0 105 111 A1 | 7/1983 | JP | 10 36495 A | 2/1998 |
| EP | | 0 850 962 A2 | 7/1998 | JP | 10 259244 A | 9/1998 |
| EP | | 0 999 228 A2 | 5/2000 | JP | 11 092555 A | 4/1999 |
| EP | | 1 065 193 A1 | 1/2001 | JP | 11 106489 A | 4/1999 |
| FR | | 2168990 | 9/1973 | JP | 11 217429 A | 8/1999 |
| FR | | 2302778 A1 | 3/1975 | JP | 2000/095851 A | 4/2000 |
| GB | | 777 128 | 6/1957 | JP | 2004 238329 | 8/2004 |
| GB | | 777 628 | 6/1957 | KR | 1993-0005144 B1 | 6/1993 |
| GB | | 1001787 | 8/1965 | KR | 1994-0011540 B1 | 3/1994 |
| GB | | 1013034 | 12/1965 | NL | 6704303 | 9/1967 |
| GB | | 1055918 | 1/1967 | PL | 136188 | 8/1987 |
| GB | | 1122538 | 8/1968 | SU | 973552 | 11/1982 |
| GB | | 1154538 | 6/1969 | WO | 95/29752 | 11/1995 |
| GB | | 1 277 376 | 6/1972 | WO | WO 96/22318 | 7/1996 |
| GB | | 1320769 | 6/1973 | WO | WO 98/08602 | 3/1998 |
| | | | | WO | WO 98/10007 | 3/1998 |

| WO | WO 99/16537 | 4/1999 |
| WO | 99/39815 | 8/1999 |
| WO | WO 02/26841 A1 | 4/2002 |
| WO | WO 02/46266 A2 | 6/2002 |
| WO | WO 02/096975 A1 | 12/2002 |
| WO | WO 03/006526 A1 | 1/2003 |
| WO | 2004/111104 | 12/2004 |
| WO | WO 2006 007966 A1 | 2/2006 |
| WO | WO 2006/083250 A1 | 8/2006 |
| WO | 2007/065211 | 6/2007 |
| WO | WO 2007065211 | 6/2007 |

OTHER PUBLICATIONS

Copending U.S. Appl. No. 11/506,099, filed Aug. 17, 2006, Bruce Roger DeBruin.
Copending U.S. Appl. No. 11/506,131, filed Aug. 17, 2006, Bruce Roger DeBruin.
Copending U.S. Appl. No. 11/506,346, filed Aug. 17, 2006, Bruce Roger DeBruin.
Copending U.S. Appl. No. 11/506,132, filed Aug. 17, 2006, Bruce Roger DeBruin.
Copending U.S. Appl. No. 11/820,244, filed Jun. 19, 2007, Bruce Roger DeBruin.
Copending U.S. Appl. No. 11/891,149, filed Aug. 9, 2007, Bruce Roger DeBruin.
Copending U.S. Appl. No. 11/635,411, filed Dec. 7, 2006, Bruce Roger DeBruin.
Copending U.S. Appl. No. 11/635,360, filed Dec. 7, 2006, Bruce Roger DeBruin.
Copending U.S. Appl. No. 11/635,448, filed Dec. 7, 2006, Bruce Roger DeBruin.
Copending U.S. Appl. No. 10/919,931, filed Aug. 17, 2004, Bruce Roger DeBruin.
Copending U.S. Appl. No. 11/776,597, filed Jul. 12, 2007, Bruce Roger DeBruin.
Copending U.S. Appl. No. 11/776,599, filed Jul. 12, 2007, Bruce Roger DeBruin et al.
Copending U.S. Appl. No. 11/776,598, filed Jul. 12, 2007, Bruce Roger DeBruin et al.
Copending U.S. Appl. No. 11/776,595, filed Jul. 12, 2007, Bruce Roger DeBruin et al.
Copending U.S. Appl. No. 11/776,587, filed Jul. 12, 2007, Bruce Roger DeBruin et al.
Copending U.S. Appl. No. 11/776,591, filed Jul. 12, 2007, Bruce Roger DeBruin et al.
Copending U.S. Appl. No. 11/715,564, filed Mar. 8, 2007, Bruce Roger DeBruin.
Copending U.S. Appl. No. 11/715,546, filed Mar. 8, 2007, Bruce Roger DeBruin.
USPTO office action dated Sep. 6, 2005 for copending U.S. Appl. No. 10/919,931.
USPTO office action dated Apr. 10, 2006 for copending U.S. Appl. No. 10/919,931.
USPTO office action dated Oct. 23, 2006 for copending U.S. Appl. No. 10/919,931.
USPTO office action dated Jun. 14, 2007 for copending U.S. Appl. No. 11/635,411.
USPTO office action dated Jul. 2, 2007 for copending U.S. Appl. No. 11/506,131.
USPTO office action dated Jul. 2, 2007 for copending U.S. Appl. No. 11/506,132.
USPTO office action dated Jul. 2, 2007 for copending U.S. Appl. No. 11/506,105.
USPTO Notice of Allowance dated Oct. 11, 2007 for copending U.S. Appl. No. 10/919,931.
USPTO office action dated Oct. 11, 2007 for copending U.S. Appl. No. 11/820,244.
USPTO office action dated Dec. 4, 2007 for copending U.S. Appl. No. 11/891,149.
USPTO Notice of Allowance dated Jan. 10, 2008 for copending U.S. Appl. No. 11/506,131.
USPTO Office Action dated Jan. 23, 2008 for copending U.S. Appl. No. 11/635,411.
USPTO Office Action dated Jan. 31, 2008 for copending U.S. Appl. No. 11/506,132.
USPTO Office Action dated Jan. 25, 2008 for copending U.S. Appl. No. 11/506,105.
USPTO Notice of Allowance dated Feb. 13, 2008 for copending U.S. Appl. No. 11/820,244.
USPTO Notice of Allowance dated Mar. 25, 2008 for copending U.S. Appl. No. 11/506,132.
Perry, Robert H. and Green, Don, "Flow in Pipes and Channels," Perry's Chemical Engineer's Handbook, 1984, pp. 5-23, $6^{th}$ Edition, McGraw-Hill, United States.
Perry, Robert H. and Green, Don, "Fluid and Particle Mechanics," Perry's Chemical Engineer's Handbook, 1984, pp. 5-40 to 5-41, $6^{th}$ Edition, McGraw-Hill, United States.
Perry, Robert H. and Green, Don, "Fluid and Particle Mechanics," Perry's Chemical Engineer's Handbook, 1984, 14-82 to 14-95, $6^{th}$ Edition, McGraw-Hill, United States.
Nauman, E.B., "Enhancement of Heat Transfer and Thermal Homogenity with Motionless Mixers," American Institute of Chemical Engineer's Journal, 1979, pp. 246-258, vol. 25, No. 2.
Brodkey, Robert S., "Multiphase Phenomena I: Pipe Flow," The Phenomena of Fluid Motions, 1967, pp. 456-538, Addison-Wesley Publishing Company, United States.
Gupta, S.K. and Kumar, Anil, "Polyester Reactors," Plenum Chemical Engineering Series, 1987, Chapter 8, pp. 241-318, Plenum Press, New York.
Stahl, Wegmann, Von Rohr; Tubular Reactor for Liquid Reactions with Gas Release, 2003, Catalysis Today, 79-80, pp. 89-95.
USPTO Notice of Allowance dated Apr. 29, 2008 for copending U.S. Appl. No. 11/891,149.
Office Action dated May 7, 2008 for copending U.S. Appl. No. 11/506,105.
USPTO Office Action dated May 7, 2008 for copending U.S. Appl. No. 11/506,105.
USPTO Office Action dated Sep. 22, 2008 for copending U.S. Appl. No. 11/891,149.
USPTO Notice of Allowance dated Oct. 7, 2008 for copending U.S. Appl. No. 11/506,105.
USPTO Office Action dated Dec. 5, 2008 for copending U.S. Appl. No. 12/173,354.
Santosh K. Gupta & Anil Kumar, "Step Growth Polymerization," The Plenum Chemical Engineering Series, 1987, Chapter 8, Plenum Press.
USPTO Supplemental Notice of Allowability dated Aug. 27, 2008 in copending U.S. Appl. No. 11/820,244.
USPTO Notice of Allowance dated Jun. 11, 2008 in copending U.S. Appl. No. 11/506,132.
USPTO Notice of Allowance dated Mar. 17, 2008 in copending U.S. Appl. No. 11/506,131.
USPTO Supplemental Notice of Allowability dated Apr. 4, 2008 in copending U.S. Appl. No. 11/506,131.
USPTO Notice of Allowability dated Oct. 7, 2008 in copending U.S. Appl. No. 11/506,105.
USPTO Office Action dated Aug. 20, 2008 for copending U.S. Appl. No. 11/635,411.
Copending U.S. Appl. No. 12/173,354, filed Jul. 15, 2008, Bruce Roger DeBruin.
Copending U.S. Appl. No. 12/186,739, filed Aug. 6, 2008, Bruce Roger DeBruin.
USPTO Office Action dated Jul. 18, 2008 for copending U.S. Appl. No. 11/506,346.
Ekivana, N.I. et al., "Structure Formation in Terephthalic Acid Pastes," 1968, Chemical Abstracts Service, Columbus OH.
USPTO Notice of Allowance dated Jan. 2, 2009 for copending U.S. Appl. No. 11/891,149.
USPTO Notice of Allowance dated Jan. 28, 2009 for copending U.S. Appl. No. 11/506,346.
USPTO Office Action dated Jan. 30, 2009 for copending U.S. Appl. No. 11/715,546.
USPTO Office Action dated Feb. 4, 2009 for copending U.S. Appl. No. 11/635,411.

USPTO Notice of Allowance dated Apr. 14, 2009 for copending U.S. Appl. No. 11/891,149.
USPTO Office Action dated Apr. 21, 2009 for copending U.S. Appl. No. 11/635,360.
USPTO Office Action dated Apr. 21, 2009 for copending U.S. Appl. No. 11/635,448.
USPTO Office Action dated Jun. 26, 2009 for copending U.S. Appl. No. 12/173,354.
USPTO Office Action dated Jul. 23, 2009 for copending U.S. Appl. No. 11/635,411.
Notice of Allowance dated Sep. 4, 2009 for copending U.S. Appl. No. 11/635,411.
Perry's Chemical Engineers' Handbook, 7th Edition, pp. 8-49 to 8-50 and pp. 14-82 to 14-95, 1997, The McGraw-Hill Companies, Inc., United States.
USPTO Notice of Allowance dated Nov. 17, 2009 for copending U.S. Appl. No. 12/173,354.
USPTO Office Action dated Feb. 18, 2010 for copending U.S. Appl. No. 11/776,597.
USPTO Office Action dated Feb. 18, 2010 for copending U.S. Appl. No. 11/776,599.
USPTO Office Action dated Feb. 18, 2010 for copending U.S. Appl. No. 11/776,600.
USPTO Office Action dated Feb. 18, 2010 for copending U.S. Appl. No. 11/776,587.
USPTO Office Action dated Feb. 18, 2010 for copending U.S. Appl. No. 11/776,591.
USPTO Office Action dated Feb. 24, 2010 for copending U.S. Appl. No. 11/776,598.
USPTO Office Action dated Feb. 24, 2010 for copending U.S. Appl. No. 11/776,595.
USPTO Office Action dated Jan. 11, 2010 for copending U.S. Appl. No. 11/635,360.
USPTO Office Action dated Jan. 20, 2010 for copending U.S. Appl. No. 12/186,739.
International Search Report and Written Opinion for PCT/US2008/008304, dated Oct. 24, 2008.
USPTO Office Action dated May 19, 2009 in copending U.S. Appl. No. 12/186,739.
USPTO Office Action dated Aug. 4, 2009 in copending U.S. Appl. No. 11/506,346.
USPTO Notice of Allowance dated Jun. 23, 2010 in copending U.S. Appl. No. 11/776,595.
USPTO Notice of Allowance dated Jun. 23, 2010 in copending U.S. Appl. No. 11/776,598.
USPTO Notice of Allowance dated Jun. 23, 2010 in copending U.S. Appl. No. 11/776,597.
USPTO Notice of Allowance dated Jun. 25, 2010 in copending U.S. Appl. No. 11/776,591.
USPTO Notice of Allowance dated Jun. 28, 2010 in copending U.S. Appl. No. 11/776,600.
USPTO Notice of Allowance dated Jun. 28, 2010 in copending U.S. Appl. No. 11/776,599.
USPTO Notice of Allowance dated Jul. 14, 2010 in copending U.S. Appl. No. 11/715,564.
USPTO Notice of Allowance dated Jul. 15, 2010 in copending U.S. Appl. No. 11/776,587.
USPTO Notice of Allowance dated Jul. 23, 2010 in copending U.S. Appl. No. 12/186,739.
USPTO Supplementary Notice of Allowance dated Sep. 21, 2010 in copending U.S. Appl. No. 11/715,564.

* cited by examiner

US 7,872,090 B2

REACTOR SYSTEM WITH OPTIMIZED HEATING AND PHASE SEPARATION

BACKGROUND OF THE INVENTION

1. Field of the Invention

This invention relates to reactors for processing liquid-containing reaction mediums. In another aspect, the invention concerns esterification and polycondensation reactors used for melt-phase production of polyesters.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have led to an increasingly competitive market for the production and sale of PET. Therefore, a low-cost, high-efficiency process for producing PET is desirable.

Generally, melt-phase polyester production facilities, including those used to make PET, employ an esterification stage and a polycondensation stage. In the esterification stage, polymer raw materials (i.e., reactants) are converted to polyester monomers and/or oligomers. In the polycondensation stage, polyester monomers exiting the esterification stage are converted into a polymer product having the desired final average chain length.

In many conventional melt-phase polyester production facilities, esterification and polycondensation are carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance.

Further, conventional CSTRs frequently employ internal heat exchange tubes that occupy a portion of the reactor's internal volume. In order to compensate for the loss in effective reactor volume, CSTRs with internal heat exchange tubes require a larger overall volume, which increases capital costs. Further, internal heat exchange coils typically associated with CSTRs can undesirably interfere with the flow patterns of the reaction medium within the vessel, thereby resulting in a loss of conversion. To increase product conversion, many conventional polyester production facilities have employed multiple CSTRs operating in series, which further increases both capital and operating costs.

Thus, a need exists for a high efficiency polyester process that minimizes capital, operational, and maintenance costs while maintaining or enhancing product quality.

SUMMARY OF THE INVENTION

In one embodiment of the present invention, there is provided a process comprising: (a) heating an initial reaction medium flowing upwardly through a heat exchanger to thereby provide a heated reaction medium; and (b) disengaging a vapor from the heated reaction medium in a horizontally elongated disengagement vessel to thereby provide a predominately liquid product, wherein at least a portion of the vapor is a byproduct of a chemical reaction carried out in the heat exchanger and/or in the disengagement vessel, wherein the disengagement vessel has a length-to-diameter (L:D) ratio in the range of from about 1.25:1 to about 8:1.

In another embodiment of the present invention, there is provided a polycondensation process comprising: (a) heating an initial reaction medium in a heat exchanger to thereby provide a heated reaction medium; and (b) disengaging a vapor from the heated reaction medium in a horizontally elongated disengagement vessel to thereby provide a predominately liquid product, wherein at least a portion of the vapor is a byproduct of a polycondensation reaction carried out in the heat exchanger and/or in the disengagement vessel, wherein the disengagement vessel has a length-to-diameter (L:D) ratio in the range of from about 1.25:1 to about 8:1.

In a further embodiment of the present invention, there is provided an esterification process comprising: (a) heating an initial reaction medium flowing upwardly through a heat exchanger to thereby provide a heated reaction medium; and (b) disengaging a vapor from the heated reaction medium in a horizontally elongated disengagement vessel to thereby provide a predominately liquid product, wherein at least a portion of the vapor is a byproduct of an esterification reaction carried out in the heat exchanger and/or in the disengagement vessel.

In yet another embodiment of the present invention, there is provided a reactor system comprising an upright heat exchanger and a horizontally elongated disengagement vessel. The heat exchanger defines an exchanger inlet and an exchanger outlet. The disengagement vessel defines a feed inlet, a vapor outlet, and a liquid outlet. The feed inlet is coupled in fluid communication with the exchanger outlet and the disengagement vessel has a length-to-diameter (L:D) ratio in the range of from about 1.25:1 to about 8:1. The liquid outlet is horizontally spaced at least about 1.25 D from the feed inlet and the liquid outlet is vertically spaced less than about 2 D from the feed inlet.

DETAILED DESCRIPTION

Figure 1:
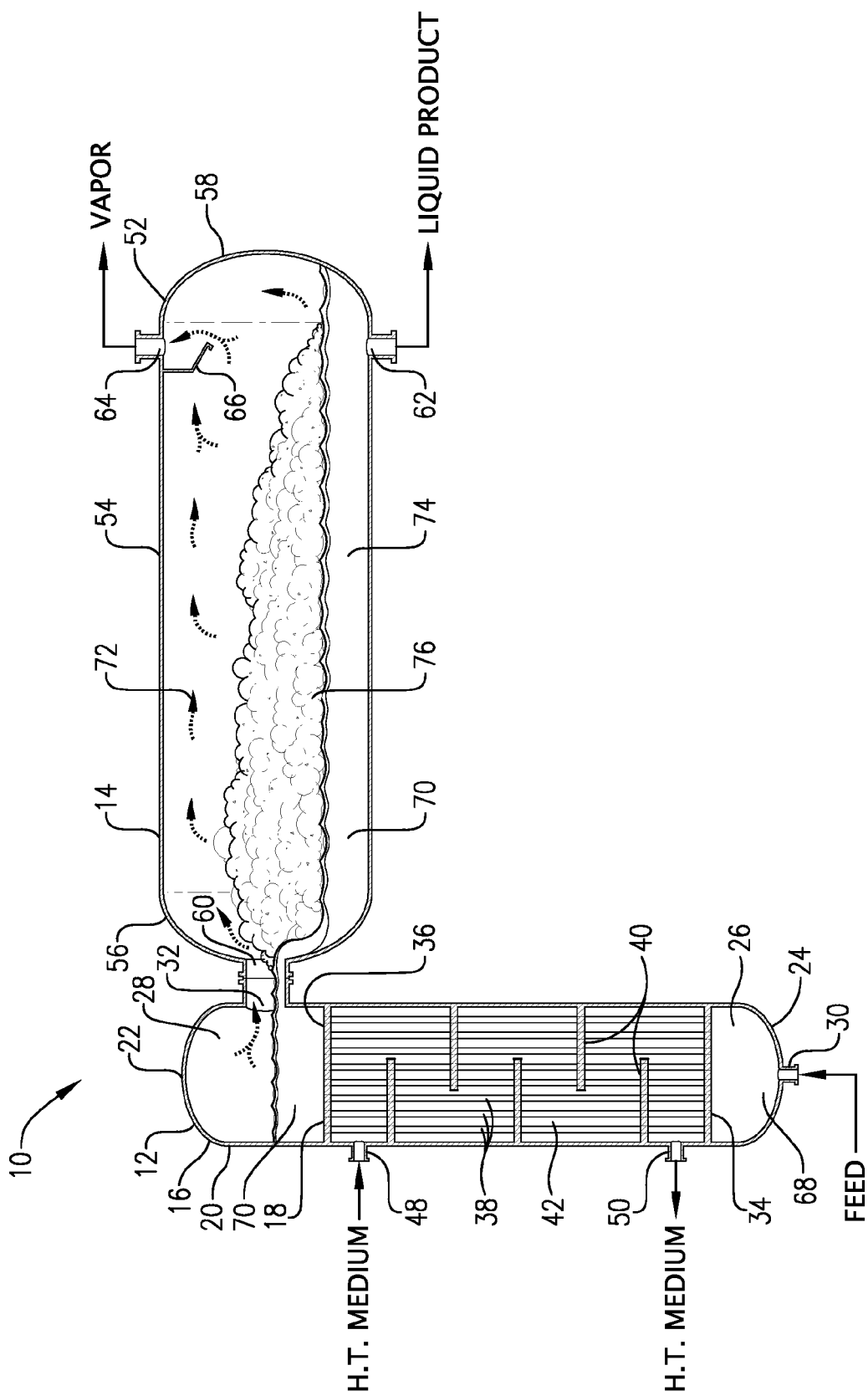
FIG. 1 is a schematic depiction of a reactor system configured in accordance with one embodiment of the present invention and suitable for use in a melt-phase polyester production facility.

FIG. 1 illustrates an exemplary reactor system configured in accordance with one embodiment of the present invention. The configuration and operation of the reactor system depicted in FIG. 1 are described in detail below. Although certain portions of the following description relate primarily to reactors employed in a melt-phase polyester production process, reactor systems configured in accordance with embodiments of the present invention may find application in a wide variety of chemical processes. For example, reactor systems configured in accordance with certain embodiments of the present invention may be advantageously employed in any process where chemical reactions take place in the liquid phase of a reaction medium and a vapor is produced as a result of the chemical reaction. Further, reactor systems configured in accordance with certain embodiments of the present may be advantageously employed in chemical processes that are enhanced by increasing the surface area of the reaction medium.

Referring now to FIG. 1, there is illustrated a reactor system 10 comprising a heat exchanger 12 and a disengagement vessel 14.

Heat exchanger 12 comprises a vertically elongated exchanger shell 16 and an exchanger core 18 disposed in exchanger shell 16. Exchanger shell 16 comprises an upright tubular member 20 with a pair of end caps 22,24 coupled to the top and bottom of tubular member 20. In certain embodiments of the present invention, heat exchanger 12 can have a height-to-width (H:W) ratio in the range of from about 1.25:1 to about 40:1, about 1.5:1 to about 15:1, or 2:1 to 8:1, where H is the maximum internal dimension of exchanger shell 16 measured in the direction of elongation of exchanger shell 16 and W is the maximum internal dimension of exchanger shell 16 measured perpendicular to the direction of elongation of exchanger shell 16. In certain embodiments, H can be in the range of from about 5 to about 100 feet, about 10 to about 75 feet, or 20 to 50 feet, while W can be in the range of from about 1 to about 50 feet, about 2 to about 30 feet, or 4 to 20 feet.

The internal volume of exchanger shell 16 includes a lower common zone 26 and an upper common zone 28, separated from one another by exchanger core 18. Exchanger shell 16 defines an exchanger inlet 30 defined in lower end cap 24 near the bottom of exchanger shell 16 and an exchanger outlet 32 defined in the side of tubular member 20 near the top of exchanger shell 16. Exchanger inlet 30 is in fluid communication with lower common zone 26, while exchanger outlet 32 is in fluid communication with upper common zone 28.

Exchanger core 18 comprises a lower head 34, an upper head 36, a plurality of heat exchange tubes 38, and a plurality of baffles 40. Lower and upper heads 34,36 can be substantially flat plates that are sealing coupled (e.g., welded) to the inside wall of exchanger shell 16. Heat exchange tubes 38 are coupled to and extend between lower and upper heads 34,36. Lower and upper heads 34,36 define a plurality of openings that correspond with the open ends of tubes 38, so that a fluid can flow upwardly through tubes 38 from lower common zone 26 to upper common zone 28. Thus, the only fluid flow path between lower and upper common zones 26,28 is via tubes 38.

A shell-side zone 42 is defined in core 18 between upper and lower heads 34,36 and outside of tubes 38. Shell-side zone 42 is configured to receive a heat transfer medium that exchanges heat with the fluid flowing upwardly through tubes 38. As depicted in FIG. 1, exchanger shell 16 defines a heat transfer medium inlet 48 for receiving the heat transfer medium into shell-side zone 42 and a heat transfer medium outlet 50 for discharging the heat transfer medium out of shell-side zone 42. The heat transfer medium is depicted as flowing counter-current to the reaction medium. One skilled in the art will recognize that alternatively, exchanger shell 16 can define an opening 50 for receiving the heat transfer medium into shell-side zone 42 and an opening 48 for discharging the heat transfer medium out of shell-side zone 42 (i.e., the heat transfer medium can flow co-current with the reaction medium). Baffles 40 extend in shell-side zone 42 and are operable to cause the heat transfer medium in shell-side zone 42 to flow through shell-side zone 42 along a tortuous path. Heat exchanger 12 is operable to a heat reaction medium flowing upwardly through exchanger core 18 via indirect heat exchange with the heat transfer medium in shell-side zone 42. The resulting heated reaction medium exits heat exchanger 12 via exchanger outlet 32 and is then introduced into disengagement vessel 14.

Disengagement vessel 14 comprises a horizontally elongated vessel shell 52 that includes an elongated tubular member 54 and a pair of end caps 56, 58 coupled to opposite ends of tubular member 54. Vessel shell 52 defines a feed inlet 60, a liquid product outlet 62, and a vapor outlet 64. In certain embodiments of the present invention, disengagement vessel 14 has a length-to-diameter (L:D) ratio of less than about 10:1, in the range of from about 1.25:1 to about 8:1, in the range of from about 1.5:1 to about 6:1, or in the range of from 2:1 to 4.5:1, where L is the maximum internal dimension of vessel shell 52 measured in the direction of elongation of vessel shell 52 and D is the maximum internal dimension of vessel shell 52 measured perpendicular to the direction of elongation of vessel shell 52. In certain embodiments, L can be in the range of from about 10 to about 200 feet, about 20 to about 150 feet, or 30 to 80 feet, while D can be in the range of from about 1 to about 50 feet, about 2 to about 30 feet, or 4 to 20 feet.

As illustrated in FIG. 1, heat exchanger 12 and disengagement vessel 14 are located in close proximity to one another. Thus, the distance between exchanger outlet 32 and feed inlet 60 can be less than about 5 D, less than about 2 D, or less than 1 D. Further, in the embodiment illustrated in FIG. 1, heat exchanger 12 and disengagement vessel 14 are directly coupled to one another (i.e., coupled with no intervening process equipment located between exchanger outlet 32 and feed inlet 60). Generally, exchanger outlet 32 and feed inlet 60 are coupled to one another by a conventional flanged connection, with a first half of the flanged connection extending from the sidewall of exchanger shell 16 and the second half of the flanged connection extending from end cap 56 of disengagement vessel shell 52.

Feed inlet 60, liquid product outlet 62, and vapor outlet 64 can be positioned to enhance vapor/liquid disengagement in disengagement vessel 14. The horizontal distance between feed inlet 60 and liquid and vapor outlets 62, 64 can be at least about 1.25 D, at least about 1.5 D, or at least 2 D. The vertical distance between feed inlet 60 and liquid outlet 64 can be less than about 2 D, in the range of from about 0.2 D to about 1 D, in the range of from about 0.25 D to about 0.75 D, or in the range of from 0.3 D to 0.5 D. The vertical distance between liquid product outlet 62 and vapor outlet 64 can be at least about 0.5 D, at least about 0.75 D, or about 1 D. As illustrated in FIG. 1, disengagement vessel 14 can also comprise a downwardly extending baffle 66. Baffle 66 can generally be disposed between feed inlet 60 and vapor outlet 64, but closer to vapor outlet 64 than to feed inlet 60. Baffle 66 can extend downwardly from the top of vessel shell 52 proximate vapor outlet 64.

Although exchanger shell 16 and disengagement vessel shell 52 are illustrated in FIG. 1 as having substantially cylindrical configurations, it should be noted that these shells can have a variety of cross sectional configurations (e.g., square, rectangular, oval, etc.). Although exchanger shell 16 and tubes 38 are illustrated in FIG. 1 as being elongated along a vertical axis of elongation, it should be noted that that the axis of elongation of exchanger shell 16 and tubes 38 need not be perfectly vertical. For example, the axis of elongation of exchanger shell 16 and/or tubes 38 can be oriented with about 30 degrees of vertical, within about 15 degrees of vertical, or within 5 degrees of vertical. Although disengagement vessel shell 52 is illustrated in FIG. 1 as being elongated along a horizontal axis of elongation, it should be noted that that the axis of elongation of disengagement vessel shell 52 need not be perfectly horizontal. For example, the axis of elongation of disengagement vessel shell 52 can be oriented with about 30 degrees of horizontal, within about 15 degrees of horizontal, or within 5 degrees of horizontal.

As depicted in FIG. 1, disengagement vessel 14 can be a substantially empty vessel. Optionally, disengagement vessel 14 can be equipped with internal heat exchange tubes, internal heat exchange coils, an external jacket, and/or external heat-tracing used to heat the reaction medium in disengagement vessel 14. In one embodiment of the present invention, less than about 50 percent, less than about 25 percent, less than about 10 percent, less than about 5 percent, or 0 percent of the total heat added to the reaction medium in disengagement vessel 14 is added via internal heat exchange tubes or coils.

As mentioned above, reactor system 10 can require little or no mechanical agitation of the reaction medium processed therein. Although the reaction medium processed in reactor system 10 may be somewhat agitated by virtue of flowing through reactor system 10, this flow agitation is not mechanical agitation. In one embodiment of the present invention, less than about 50 percent, less than about 25 percent, less than about 10 percent, less than about 5 percent, or 0 percent of the total agitation of the reaction medium processed in heat exchanger 12 and/or disengagement vessel 14 of reactor system 10 is provided by mechanical agitation. Thus, reactor systems configured in accordance with certain embodiments of the present invention can operate without any mechanical mixing devices. This is in direct contrast to conventional continuous stirred tank reactors (CSTRs) which employ mechanical agitation almost exclusively.

The operation of reactor system 10 will now be described in detail. In general, reactor system 10 can be employed to facilitate a chemical reaction in a reaction medium by heating the reaction medium in heat exchanger 12 and then disengaging a vapor from the reaction medium in disengagement vessel 14. Specific examples of chemical reactions that can be carried out in reactor system are provided below. In general, however, reactor system 10 can be used to facilitate any type of reaction where (1) heat input is required, (2) the reaction takes place in the liquid phase of a reaction medium, (3) a vapor is produced from the reaction medium, and (4) it is desirable to disengage the vapor from the reaction medium.

The process carried out in reactor system 10 can begin by introducing a predominately liquid exchanger feed into heat exchanger 12 via exchanger inlet 30. The exchanger feed forms an initial reaction medium 68 in lower common zone 26 of heat exchanger 12. Initial reaction medium 68 is then passed upwardly through tubes 38 of core 18. At the same time, a hot heat transfer medium is circulated through shell-side zone 42 from heat transfer medium inlet 48 to heat transfer medium outlet 50. The heat transfer medium can flow generally downwardly through shell-side zone 42 (i.e., countercurrent to the direction of flow of reaction medium 68 in tubes 38). As the heat transfer medium flows through shell-side zone 42, it surrounds and contacts the outside of tubes 38 to thereby heat initial reaction medium 68 flowing upwardly though tubes 38. Thus, initial reaction medium 68 flowing upwardly through tubes 38 is heated by indirect heat exchange with the heat transfer medium in shell-side zone 42, thereby producing a heated reaction medium 70 that exits the top of core 18 and enters upper common zone 28 of heat exchanger 12. Heated reaction medium 70 then flows out of heat exchanger 12 via exchanger outlet 32 and into disengagement vessel 14 via feed inlet 60.

In disengagement vessel 14, a vapor 72 is disengaged from heated reaction medium 70. Vapor 72 can be formed in heat exchanger 12 and/or in disengagement vessel 14. Vapor 72 can comprise a byproduct of the chemical reaction carried out in reactor system 10 and/or a volatile component of the exchanger feed that is vaporized in reactor system 10.

As illustrated in FIG. 1, heated reaction medium 70 can comprise a predominately liquid portion 74 and a foam portion 76. Foam portion 76 can be generated in heat exchanger 12 and/or in disengagement vessel 14. Regardless of whether or not heated reaction medium 70 comprises a foam portion, the predominately liquid portion 74 of heated reaction medium 70 flows generally horizontally across the bottom of disengagement vessel 14 and towards liquid outlet 62. As the predominately liquid portion 74 of heated reaction medium 70 flows through disengagement vessel 14, vapor 72 flows generally over heated reaction medium 70 and towards vapor outlet 64.

Baffle 66, which is located near vapor outlet 64, is configured to ensure that substantially no foam or entrained liquids exit disengagement vessel 14 via vapor outlet 64. Further, the length of disengagement vessel 14, liquid flow rate through disengagement vessel 14, volume of disengagement vessel 14, surface area of heated reaction medium 70, and depth of heated reaction medium 70 in disengagement vessel 14 help to ensure that substantially no foam exits disengagement vessel 14 via liquid product outlet 62. Generally, the maximum depth of predominately liquid portion 74 of reaction medium 70 in disengagement vessel 14 can be less than about 0.75 D, less than about 0.6 D, less than about 0.5 D, or less than 0.3 D. Generally, predominately liquid portion 74 of reaction medium 70 occupies less than about 50 percent, less than about 25 percent, or less than 15 percent of the total internal volume of disengagement vessel. After passing through disengagement vessel 14, predominately liquid portion 74 of heated reaction medium 70 exits disengagement vessel 14 via liquid product outlet 62 as a predominately liquid product and vapor 72 exits disengagement vessel 14 via vapor outlet 64.

As indicated above, reactor systems configured in accordance with embodiments of the present invention reactors can be used in a variety of chemical processes. In one embodiment, a reactor system configured in accordance with the present invention is employed in a melt-phase polyester production facility capable of producing any of a variety of polyesters from a variety of starting materials. Examples of melt-phase polyesters that can be produced in accordance with embodiments of the present invention include, but are not limited to, polyethylene terephthalate (PET), which includes homopolymers and copolymers of PET; fully aromatic or liquid crystalline polyesters; biodegradable polyesters, such as those comprising butanediol, terephthalic acid and adipic acid residues; poly(cyclohexane-dimethylene terephthalate) homopolymer and copolymers; and homopolymers and copolymers of 1,4-cyclohexane-dimethanol (CHDM) and cyclohexane dicarboxylic acid or dimethyl cyclohexanedicarboxylate. When a PET copolymer is produced, such copolymer can comprise at least 90, at least 91, at least 92, at least 93, at least 94, at least 95, at least 96, at least 97, at least 98 mole percent of ethylene terephthalate repeat units and up to 10, up to 9, up to 8, up to 7, up to 6, up to 5, up to 4, up to 3, or up to 2 mole percent of added comonomer repeat units. Generally, the comonomer repeat units can be derived from one or more comonomers selected from the group consisting of isophthalic acid, 2,6-naphthaline-dicarboxylic acid, CHDM, and diethylene glycol.

In general, a polyester production process according to certain embodiments of the present invention can comprise two main stages—an esterification stage and a polycondensation stage. In the esterification stage, the polyester starting materials, which can comprise at least one alcohol and at least one acid, are subjected to esterification to thereby produce polyester monomers and/or oligomers. In the polycondensation stage, the polyester monomers and/or oligomers from the esterification stage are reacted into the final polyester product. As used herein with respect to PET, monomers have less than 3 chain lengths, oligomers have from about 7 to about 50 chain lengths (components with a chain length of 4 to 6 units can be considered monomer or oligomer), and polymers have greater than about 50 chain lengths. A dimer, for example, EG-TA-EG-TA-EG, has a chain length of 2, and a trimer 3, and so on.

The acid starting material employed in the esterification stage can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material employed in the esterification stage can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxyethoxyphenyl)-propane, 2,2-bis-(4-hydroxy-propoxyphenyl)-propane, isosorbide, hydroquinone, BDS-(2,2-(sulfonylbis)4,1-phenyleneoxy))bis(ethanol), and mixtures thereof.

In addition, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, and mixtures thereof.

Both the esterification stage and the polycondensation stage of a melt-phase polyester production process can include multiple steps. For example, the esterification stage can include an initial esterification step for producing a partially esterified product that is then further esterified in a secondary esterification step. Also, the polycondensation stage can include a prepolymerization step for producing a partially condensed product that is then subjected to a finishing step to thereby produce the final polymer product.

The reactor system configured in accordance with certain embodiments of the present invention can be employed in a melt-phase polyester production system as a secondary esterification reactor system for carrying out a secondary esterification step, as a prepolymer reactor system for carrying out the prepolymerization step, and/or as a finisher reactor system for carrying out a finishing step. In one embodiment, two or more of the second esterification step, the prepolymerization step, and the finishing step can be combined and carried out in a single reactor system constructed in accordance with the present invention. A detailed description of the process conditions for the present invention employed as an esterification reactor system, a prepolymer reactor system, and/or a finisher reactor system is given below with reference to FIG. 1. It is understood that the process conditions described below are not limited to the embodiment depicted in FIG. 1.

Referring again to FIG. 1, when reactor system 10 is employed as a secondary esterification reactor system in a melt-phase polyester production process (e.g., a process for making PET), more than one chemical reaction can be carried out in reactor system 10. For example, although esterification may be the primary chemical reaction carried out in reactor system 10, a certain amount of polycondensation may also occur in reactor system 10. When reactor system 10 is employed as a secondary esterification reactor, the feed introduced into exchanger inlet 30 of heat exchanger 12 can have an average conversion in the range of from about 70 to about 95 percent, about 75 to about 90 percent, or 80 to 88 percent, while the predominately liquid product withdrawn from liquid product outlet 62 of disengagement vessel 14 can have an average conversion of at least about 80 percent, at least about 90 percent, at least about 95 percent, or at least 98 percent. Generally, the esterification reaction carried out in reactor system 10 increases the average conversion of the reaction medium processed in reactor system 10 by at least about 2 percentage points, at least about 5 percentage points, or at least 10 percentage points between exchanger inlet 30 and liquid product outlet 62. Further, the average chain length of the feed introduced into exchanger inlet 30 of heat exchanger 12 can be less than about 5, less than about 2 or less than 1, while the predominately liquid product withdrawn from liquid product outlet 62 of disengagement vessel 14 can have an average chain length in the range of from about 1 to about 20, about 2 to about 15, or 5 to 12. Generally, the average chain length of the reaction medium processed in reactor system 10 can increase in the range of from about 1 to about 20, about 2 to about 15, or 5 to 12 between exchanger inlet 30 and liquid product outlet 62.

When reactor system 10 is employed as a secondary esterification reactor system in a melt-phase polyester production process, the exchanger feed can enter exchanger inlet 30 at a temperature in the range of from about 160 to about 330° C., about 195 to about 285° C., or 240 to 270° C., while the heated reaction medium 70 exiting exchanger outlet 32 can have a temperature in the range of from about 180 to about 350° C., about 215 to about 305° C., or 260 to 290° C. Thus, heat exchanger 12 can be used to increase the temperature of initial reaction medium 68 by at least about 5° C., in the range of from about 10 to about 50° C., or in the range of from 15 to 40° C. The amount of heating provided by heat exchanger 12 can be in the range of from about 100 to about 5,000 BTU per pound of reaction medium (BTU/lb), in the range of from about 400 to about 2,000 BTU/lb, or in the range of from 600 to 1,500 BTU/lb.

When reactor system 10 is employed as a secondary esterification reactor, the heated reaction medium 70 can enter disengagement vessel 14 via inlet 60 at a temperature in the range of from about 180 to about 350° C., about 215 to about 305° C., or 260 to 290° C. The predominately liquid product exiting liquid product outlet 62 can have a temperature within about 50° C., 25° C., or 10° C. of the temperature of heated reaction medium 70 entering inlet 60. In one embodiment, the temperature of the liquid product exiting liquid product outlet 62 can be in the range of from about 180 to about 350° C., about 215 to about 305° C., or 260 to 290° C. The average temperature of heated reaction medium 70 in disengagement vessel 14 can be maintained in the range of from about 180 to about 350° C., about 215 to about 305° C., or 260 to 290° C. The average temperature of reaction medium 70 is the average of at least three temperature measurements taken at equal spacings along the primary flow path of reaction medium 70 through disengagement vessel 14, where the temperature measurements are each taken near the cross sectional centroid of predominately liquid portion 74 of reaction medium 70 (as opposed to near the wall of the vessel or near the upper surface of the predominately liquid portion). When reactor system 10 is employed as a secondary esterification reactor, the vapor space pressure in both heat exchanger 12 and disengagement vessel 14 (measured at outlets 32 and 64, respectively) can be maintained at less than about 70 psig, in the range of from about −4 to about 10 psig, or in the range of from 2 to 5 psig.

Referring again to FIG. 1, when reactor system 10 is employed as a prepolymer reactor system in a melt-phase polyester production process (e.g., a process for making PET), more than one chemical reaction can be carried out in reactor system 10. For example, although polycondensation may be the predominate chemical reaction carried out in reactor system 10, a certain amount of esterification may also occur in reactor system 10. When reactor system 10 is employed as a prepolymer reactor, the average chain length of the feed introduced into exchanger inlet 30 of heat exchanger 12 can be in the range of from about 1 to about 20, about 2 to about 15, or 5 to 12, while the average chain length of the predominately liquid product withdrawn from liquid product outlet 62 of disengagement vessel 14 can be in the range of from about 5 to about 50, about 8 to about 40, or 10 to 30. Generally, the average chain length of the reaction medium processed in reactor system 10 can increase by at least about 2, in the range of from about 5 to about 30, or in the range of from 8 to 20 between exchanger inlet 30 and liquid product outlet 62.

When reactor system 10 is employed as a prepolymer reactor system in a melt-phase polyester production process, the exchanger feed can enter exchanger inlet 30 at a temperature in the range of from about 200 to about 330° C., about 245 to about 285° C., or 250 to 270° C., while the heated reaction medium 70 exiting exchanger outlet 32 can have a temperature in the range of from about 220 to about 350° C., about 265 to about 305° C., or 270 to 290° C. Thus, heat exchanger 12 can be used to increase the temperature of initial reaction medium 68 by at least about 50° C., in the range of from about 10 to about 50° C., or in the range of from 15 to 40° C. The amount of heating provided by heat exchanger 12 can be in the range of from about 100 to about 5,000 BTU per pound of reaction medium (BTU/lb), in the range of from about 400 to about 2,000 BTU/lb, or in the range of from 600 to 1,500 BTU/lb.

When reactor system 10 is employed as a prepolymer reactor, the heated reaction medium 70 can enter disengagement vessel 14 via inlet 60 at a temperature in the range of from about 220 to about 350° C., about 265 to about 305° C., or 270 to 290° C. The predominately liquid product exiting liquid product outlet 62 can have a temperature within about 50° C., 25° C., or 10° C. of the temperature of the heated reaction medium 70 entering inlet 60. In one embodiment, the temperature of the liquid product exiting liquid product outlet 62 is in the range of from about 220 to about 350° C., about 265 to about 305° C., or 270 to 290° C. The average temperature of heated reaction medium 70 in disengagement vessel 14 can be maintained in the range of from about 220 to about 350° C., about 265 to about 305° C., or 270 to 290° C. The vapor space pressure in both heat exchanger 12 and disengagement vessel 14 can be maintained in the range of from about 0 to about 300 torr, about 1 to about 50 torr, or in the range of from 20 to 30 torr.

Referring again to FIG. 1, when reactor system 10 is employed as a finisher reactor system in a melt-phase polyester production process (e.g., a process for making PET), the average chain length of the feed introduced into exchanger inlet 30 of heat exchanger 12 can be in the range of from about 5 to about 50, about 8 to about 40, or 10 to 30, while the average chain length of the predominately liquid product withdrawn from liquid product outlet 62 of disengagement vessel 14 can be in the range of from about 30 to about 210, about 40 to about 80, or 50 to 70. Generally, the average chain length of the reaction medium processed in reactor system 10 can increase by at least about 10, at least about 25, or at least 50 between exchanger inlet 30 and liquid product outlet 62.

When reactor system 10 is employed as a finisher reactor system in a melt-phase polyester production process, the exchanger feed can enter exchanger inlet 30 at a temperature in the range of from about 200 to about 330° C., about 245 to about 285° C., or 250 to 270° C., while the heated reaction medium 70 exiting exchanger outlet 32 can have a temperature in the range of from about 220 to about 350° C., about 265 to about 305° C., or 270 to 290° C. Thus, heat exchanger 12 can be used to increase the temperature of initial reaction medium 68 by at least about 50° C., in the range of from about 10 to about 50° C., or in the range of from 15 to 40° C. The amount of heating provided by heat exchanger 12 can be in the range of from about 100 to about 5,000 BTU per pound of reaction medium (BTU/lb), in the range of from about 400 to about 2,000 BTU/lb, or in the range of from 600 to 1,500 BTU/lb.

When reactor system 10 is employed as a finisher reactor, the heated reaction medium 70 can enter disengagement vessel 14 via inlet 60 at a temperature in the range of from about 220 to about 350° C., about 265 to about 305° C., or 270 to 290° C. The predominately liquid product exiting liquid product outlet 62 can have a temperature within about 50° C., 25° C., or 10° C. of the temperature of the heated reaction medium 70 entering inlet 60. In one embodiment, the temperature of the liquid product exiting liquid product outlet 62 is in the range of from about 220 to about 350° C., about 265 to about 305° C., or 270 to 290° C. The average temperature of heated reaction medium 70 in disengagement vessel 14 can be maintained in the range of from about 220 to about 350° C., about 265 to about 305° C., or 270 to 290° C. The vapor space pressure in both heat exchanger 12 and disengagement vessel 14 can be maintained in the range of from about 0 to about 30 torr, about 1 to about 20 torr, or in the range of from 2 to 10 torr.

Reactor systems configured in accordance with embodiments of the present invention can provide numerous advantages when employed as reactors in the esterification and/or polycondensation stages of a polyester production process. Such reactor systems can be particularly advantageous when employed as secondary esterification or prepolymer reactors in a process for making PET. Further, such reactor systems are well suited for use in commercial scale PET production facilities capable of producing PET at a rate of at least about 10,000 pounds per hours, at least about 100,000 pounds per hour, at least about 250,000 pounds per hour, or at least 500,000 pounds per hour.

In one embodiment of the present invention, there is provided a process comprising: (a) heating an initial reaction medium flowing upwardly through a heat exchanger to thereby provide a heated reaction medium; and (b) disengaging a vapor from the heated reaction medium in a horizontally elongated disengagement vessel to thereby provide a predominately liquid product, wherein at least a portion of the vapor is a byproduct of a chemical reaction carried out in the heat exchanger and/or in the disengagement vessel, wherein the disengagement vessel has a length-to-diameter (L:D) ratio in the range of from about 1.25:1 to about 8:1. The features described for the reaction medium, heat exchanger, and disengagement vessel for the embodiment shown in FIG. 1 apply to this embodiment.

In one example of the process, the disengagement vessel is directly coupled to the heat exchanger. Additionally, the disengagement vessel can be spaced less than about 5 D, less than about 2 D, or less than 1 D from the heat exchanger.

In one example of the process, the disengagement vessel comprises a substantially horizontal pipe and a pair of end-caps coupled to opposite ends of the pipe. Additionally, the disengagement vessel can have an L:D ratio of less than about 10:1, in the range of from about 1.25:1 to about 8:1, in the range of from about 1.5:1 to about 6:1, or in the range of from 2:1 to 4.5:1.

In one example of the process, the heated reaction medium forms foam in the heat exchanger and/or in the disengagement vessel. The heat reaction medium that forms foam can comprise a foam portion and a predominately liquid portion, wherein substantially none of the foam portion exits the disengagement vessel.

In one example of the process, the chemical reaction comprises esterification and/or polycondensation. The detailed description of FIG. 1 reactor 10 employed as a second stage esterification, prepolymerization, and/or finisher reactor given above applies to this example of the present invention. Specifically the feed characteristics (e.g., conversion and/or chain length), temperature, pressure, conversion increase, average chain length increase, product characteristics, and any heat input all apply to this example of the present invention.

In one example of the process, a product is removed from a product outlet of the reactor, wherein the reaction medium forms the product in the reactor. Additionally, when the chemical reaction comprises polycondensation, the product can be a polycondensation product. The It.V. of the product or polycondensation product can be in the range of from about 0.3 to about 1.2, about 0.35 to about 0.6, or 0.4 to 0.5 dL/g. In one example, It.V. of the product or polycondensation product is in the range of from about 0.1 to about 0.5, about 0.1 to about 0.4, or 0.15 to 0.35 dL/g. In one example, a feed is introduced to a feed inlet of the reactor to form the reaction medium and the It.V. of the feed is in the range of from about 0.1 to about 0.5, about 0.1 to about 0.4, or 0.15 to 0.35 dL/g.

The Intrinsic viscosity (It.V.) values are set forth in dL/g units as calculated from the inherent viscosity measured at 25° C. in 60% phenol and 40% 1,1,2,2-tetrachloroethane by weight. Polymer samples can be dissolved in the solvent at a concentration of 0.25 g/50 mL. The viscosity of the polymer solutions can be determined, for example, using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.5 g/100 mL of 60% phenol and 40% 1,1,2,2-tetrachloroethane by weight ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} (\ln \eta_r)/C$$

where
$\eta_{int}$=Intrinsic viscosity
$\eta_r$=Relative viscosity=$t_s/t_o$
$\eta_{sp}$=Specific viscosity=$\eta_r - 1$ The intrinsic viscosity (It.V. or $\eta_{int}$) may be estimated using the Billmeyer equation as follows:

$$\eta_{int} = 0.5[e^{0.5 \times Ih.V.} - 1] + (0.75 \times Ih.V.)$$

The reference for estimating intrinsic viscosity (Billmeyer relationship) is *J. Polymer Sci.*, 4, pp. 83-86 (1949).

The viscosity of the polymer solutions can also be determined using a Viscotek Modified Differential Viscometer (a description of the operating principle of the differential pressure viscometers can be found in ASTM D 5225) or other methods known to one skilled in the art.

In another embodiment of the present invention, there is provided a polycondensation process comprising: (a) heating an initial reaction medium in a heat exchanger to thereby provide a heated reaction medium; and (b) disengaging a vapor from the heated reaction medium in a horizontally elongated disengagement vessel to thereby provide a predominately liquid product, wherein at least a portion of the vapor is a byproduct of a polycondensation reaction carried out in the heat exchanger and/or in the disengagement vessel, wherein the disengagement vessel has a length-to-diameter (L:D) ratio less than about 10:1, in the range of from about 1.25:1 to about 8:1, in the range of from about 1.5:1 to about 6:1, or in the range of from 2:1 to 4.5:1. The features described for the reaction medium, heat exchanger, and disengagement vessel for the embodiment shown in FIG. 1 apply to this embodiment.

In one example of the polycondensation process, the average chain length of the initial reaction medium introduced into the heat exchanger is in the range of from about 1 to about 20, about 2 to about 15, or 5 to 12 wherein the average chain length of the predominately liquid product is at least about 2, in the range from about 5 to about 30, or 8 to 20 greater than the average chain length of the initial reaction medium introduced into the heat exchanger.

In one example of the polycondensation process, the temperature of the heated reaction medium exiting the heat exchanger is in the range of from about 220 to about 350° C., about 265 to about 305° C., or 270 to 290° C. and the vapor space pressure in the disengagement vessel is maintained in the range of from about 0 to about 300 torr, about 1 to about 50 torr, or 20 to 30 torr.

In one example of the polycondensation process, the predominately liquid product comprises polyethylene terephthalate at least partly formed by the polycondensation reaction.

In one example of the polycondensation process, the disengagement vessel is directly coupled to the heat exchanger and is spaced less than 5 D, less than 2 D, or less than 1 D from the heat exchanger.

In one example of the polycondensation process, the initial reaction medium flows upwardly through a plurality of substantially vertical tubes of the heat exchanger during the heating.

In one example of the polycondensation process, the disengagement vessel comprises a substantially horizontal pipe and a pair of end caps coupled to opposite ends of the pipe.

In one example of the polycondensation process, the disengagement vessel defines a feed inlet for receiving at least a portion of the heated reaction medium, a vapor outlet for discharging at least a portion of the vapor, and a liquid outlet for discharging at least a portion of the predominately liquid product, wherein the liquid outlet and the vapor outlet are each horizontally spaced at least about 1.25 D, at least about 1.5 D, or at least 2 D from the feed inlet.

In one example of the polycondensation process, the heated reaction medium comprises a predominately liquid portion, wherein the maximum depth of the predominately liquid portion in the disengagement vessel is less than about 0.75 D, less than about 0.6 D, less than about 0.5 D, or less than 0.3 D.

In one example of the polycondensation process, the It.V. of the polycondensation feed is in the range of from about 0.1 to about 0.5, about 0.1 to about 0.4, or about 0.15 to about 0.35 dL/g. In one example, the It.V. of or polycondensation product is in the range of from about 0.3 to about 1.2, about 0.35 to about 0.6, or 0.4 to 0.5 dL/g.

In a further embodiment of the present invention, there is provided an esterification process comprising: (a) heating an initial reaction medium flowing upwardly through a heat exchanger to thereby provide a heated reaction medium; and (b) disengaging a vapor from the heated reaction medium in a horizontally elongated disengagement vessel to thereby provide a predominately liquid product, wherein at least a portion of the vapor is a byproduct of an esterification reaction carried out in the heat exchanger and/or in the disengagement vessel. The features described for the reaction medium, heat exchanger, and disengagement vessel for the embodiment shown in FIG. 1 apply to this embodiment.

In one example of the esterification process, the average conversion of the initial reaction medium introduced into the heat exchanger is in the range of from about 70 to about 95, about 75 to about 90, or 80 to 88 percent wherein the average conversion of the predominately liquid product is at least about 2, at least about 5, or at least 10 percentage points greater than the conversion of the initial reaction medium introduced into the heat exchanger.

In one example of the esterification process, the average chain length of the predominately liquid product is in the range of from about 1 to about 20, about 2 to about 15, or 5 to 12.

In one example of the esterification process, the temperature of the heated reaction medium exiting the heat exchanger is the range of from about 180 to about 350° C., about 215 to about 305° C., or 260 to 290° C., and the vapor space pressure in the disengagement vessel is maintained at less than about 70 psig, from about −4 to about 10 psig, or 2 to 5 psig.

In one example of the esterification process, the predominately liquid product comprises a polyethylene terephthalate oligomer.

In one example of the esterification process, the heat exchanger comprises a plurality of substantially vertical tubes through which the initial reaction medium flows during the heating.

In one example of the esterification process, the disengagement vessel comprises a substantially horizontal pipe and a pair of end caps coupled to opposite ends of the pipe.

In one example of the esterification process, the disengagement vessel has a length-to-diameter (L:D) ratio less than about 10:1, in the range of from about 1.25:1 to about 8:1, in the range of from about 1.5:1 to about 6:1, or in the range of from 2:1 to 4.5:1. Additionally, the disengagement vessel can be directly coupled to the heat exchanger, wherein the disengagement vessel is spaced less than 5 D, less than 2 D, or less than 1 D from the heat exchanger. Furthermore, the disengagement vessel can define a feed inlet for receiving at least a portion of the heated reaction medium a vapor outlet for discharging at least a portion of the vapor, and a liquid outlet for discharging at least a portion of the predominately liquid product, wherein the liquid outlet is horizontally spaced at least about 1.25 D, at least about 1.5 D, or at least 2 D from the feed inlet, and the vapor outlet is horizontally spaced at least about 1.25 D, at least about 1.5 D, or at least 2 D from the feed inlet.

In one example of the esterification process, the disengagement vessel has a length-to-diameter (L:D) ratio less than about 10:1, in the range of from about 1.25:1 to about 8:1, in the range of from about 1.5:1 to about 6:1, or in the range of from 2:1 to 4.5:1. Additionally, the disengagement vessel can be directly coupled to the heat exchanger, wherein the disengagement vessel is spaced less than 5 D, less than 2 D, or less than 1 D from the heat exchanger. Furthermore, the heated reaction medium can comprise a predominately liquid portion, wherein the maximum depth of the predominately liquid portion in the disengagement vessel is less than about 0.75 D, less than about 0.6 D, less than about 0.5 D, or less than 0.3 D.

In yet another embodiment of the present invention, there is provided a reactor system comprising an upright heat exchanger and a horizontally elongated disengagement vessel. The heat exchanger defines an exchanger inlet and an exchanger outlet. The disengagement vessel defines a feed inlet, a vapor outlet, and a liquid outlet. The feed inlet is coupled in fluid communication with the exchanger outlet and the disengagement vessel has a length-to-diameter (L:D) ratio less than about 10:1, in the range of from about 1.25:1 to about 8:1, in the range of from about 1.5:1 to about 6:1, or in the range of from 2:1 to 4.5:1. The liquid outlet is horizontally spaced at least about 1.25 D, at least about 1.5 D, or at least 2 D from the feed inlet and the liquid outlet is vertically spaced less than about 2 D, in the range of from about 0.2 D to about 1 D, about 0.25 D to about 0.75 D, or 0.3 D to 0.5 D from the feed inlet. The features described for the reaction medium, heat exchanger, and disengagement vessel for the embodiment shown in FIG. 1 apply to this embodiment.

In one example of the reactor system, the disengagement vessel is directly coupled to the heat exchanger, and the feed inlet is spaced less than 5 D, less than 2 D, or less than 1 D from the liquid outlet.

In one example of the reactor system, the exchanger outlet is located at a higher elevation than the exchanger inlet.

In one example of the reactor system, the heat exchanger comprises a plurality of substantially vertical tubes, wherein the heat exchanger is operable to heat a fluid flowing upwardly through the tubes.

In one example of the reactor system, the liquid outlet is vertically spaced less than about 2 D, in the range of from about 0.2 D to about 1 D, about 0.25 D to about 0.75 D, or 0.3 D to 0.5 D below the feed inlet.

In one example of the reactor system, the disengagement vessel comprises a substantially straight, substantially horizontal pipe and a pair of end caps coupled to opposite ends of the pipe. Additionally, one of the end caps can define the feed inlet.

In one example of the reactor system, the disengagement vessel comprises a substantially straight, substantially horizontal pipe and a pair of end caps coupled to opposite ends of the pipe and the liquid outlet is located near the bottom of the pipe, wherein the vapor outlet is located near the top of the pipe.

In one example of the reactor system, the disengagement vessel comprises a downwardly extending baffle located generally between the feed inlet and the vapor outlet, wherein the baffle is located closer to the vapor outlet than to the feed inlet.

In one example of the reactor system, the L:D ratio less than about 10:1, in the range of from about 1.25:1 to about 8:1, in the range of from about 1.5:1 to about 6:1, or in the range of from 2:1 to 4.5:1.

In one example of the reactor system, the reactor system does not comprise any mechanical mixing devices.

In one example of the reactor system, the disengagement vessel does not comprise any internal heat exchange tubes.

Numerical Ranges

The present description uses numerical ranges to quantify certain parameters relating to the invention. It should be understood that when numerical ranges are provided, such ranges are to be construed as providing literal support for claim limitations that only recite the lower value of the range, as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "a," "an," "the," and "said" means one or more.

As used herein, the term "agitation" refers to work dissipated into a reaction medium causing fluid flow and/or mixing.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "average chain length" means the average number of repeating units in the polymer. For a polyester, average chain length means the number of repeating acid and alcohol units. Average chain length is synonymous with the number average degree of polymerization (DP). The average chain length can be determined by various means known to those skilled in the art. For example, 1H-NMR can be used to directly determine the chain length based upon end group analysis, and light scattering can be used to measure the weight average molecular weight with correlations used to determine the chain length. Chain length is often calculated based upon correlations with gel permeation chromatography (GPC) measurements and/or viscosity measurements.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided below.

As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage.

As used herein, the term "directly coupled" refers to a manner of coupling two vessels in fluid flow communication with one another without the use of an intermediate connector having a substantially narrower diameter than the two vessels.

As used herein, the term "esterification" refers to both esterification and ester exchange reactions.

As used herein, the terms "having," "has," and "have" have the same open-ended meaning as "comprising," "comprises," and "comprise," provided above.

As used herein, the term "horizontally elongated" means that the maximum horizontal dimension is larger than the maximum vertical dimension.

As used herein, the terms "including," "includes," and "include" have the same open-ended meaning as "comprising," "comprises," and "comprise," provided above.

As used herein, the term, "mechanical agitation" refers to agitation of a reaction medium caused by physical movement of a rigid or flexible element(s) against or within the reaction medium.

As used herein, the term "open flow area" refers to the open area available for fluid flow, where the open area is measured along a plane that is perpendicular to the direction of flow through the opening.

As used herein, the term "pipe" refers to a substantially straight elongated tubular member having a generally cylindrical sidewall.

As used herein, the terms "polyethylene terephthalate" and "PET" include PET homopolymers and PET copolymers.

As used herein, the terms "polyethylene terephthalate copolymer" and "PET copolymer" mean PET that has been modified by up to 10 mole percent with one or more added comonomers. For example, the terms "polyethylene terephthalate copolymer" and "PET copolymer" include PET modified with up to 10 mole percent isophthalic acid on a 100 mole percent carboxylic acid basis. In another example, the terms "polyethylene terephthalate copolymer" and "PET copolymer" include PET modified with up to 10 mole percent 1,4-cyclohexane dimethanol (CHDM) on a 100 mole percent diol basis.

As used herein, the term "polyester" refers not only to traditional polyesters, but also includes polyester derivatives, such as, for example, polyetheresters, polyester amides, and polyetherester amides.

As used herein, "predominately liquid" means more than 50 volume percent liquid.

As used herein, the term "reaction medium" refers to any medium subjected to chemical reaction.

As used herein, the term "residue" refers to the moiety that is the resulting product of the chemical species in a particular reaction scheme or subsequent formulation or chemical product, regardless of whether the moiety is actually obtained from the chemical species.

As used herein, the term "upright" indicates an angle of within 45 degrees of vertical.

As used herein, the term "vapor byproduct" includes the vapor generated by a desired chemical reaction (i.e., a vapor coproduct) and any vapor generated by other reactions (i.e., side reactions) of the reaction medium.

As used herein, the term "vertically elongated" means that the maximum vertical dimension is larger than the maximum horizontal dimension.

CLAIMS NOT LIMITED TO DISCLOSED EMBODIMENTS

The exemplary embodiments of the invention described above are to be used as illustration only, and should not be used in a limiting sense to interpret the scope of the claimed invention. Various modifications to the above-described exemplary embodiments could be readily made by those skilled in the art without departing from the scope of the invention as set forth in the following claims.

What is claimed is:

1. A process comprising: (a) introducing an initial reaction medium into a heat exchanger, wherein said initial reaction medium comprises PET, (b) heating said initial reaction medium flowing upwardly through said heat exchanger to thereby provide a heated reaction medium; and (c) disengaging a vapor from said heated reaction medium in a horizontally elongated disengagement vessel to thereby provide a predominately liquid product, wherein at least a portion of said vapor is a byproduct of a polycondensation reaction carried out in said heat exchanger and/or in said disengagement vessel, wherein said disengagement vessel has a length-to-diameter (L:D) ratio in the range of from about 1.25:1 to about 8:1 and wherein said disengagement vessel is directly coupled to said heat exchanger.

2. The process of claim 1, wherein said disengagement vessel is spaced less than 5 D from said heat exchanger.

3. The process of claim 1, wherein said heat exchanger comprises a plurality of substantially vertical tubes through which said initial reaction medium flows during said heating.

4. The process of claim 1, wherein said heated reaction medium flows substantially horizontally in said disengagement vessel.

5. The process of claim 1, wherein said disengagement vessel comprises a substantially horizontal pipe and a pair of end caps coupled to opposite ends of said pipe.

6. The process of claim 5, wherein said disengagement vessel has an L:D ratio in the range of from about 1.5:1 to about 6:1.

7. The process of claim 1, wherein said disengagement vessel defines a feed inlet for receiving at least a portion of said heated reaction medium and a liquid outlet for discharging at least a portion of said predominately liquid product, wherein said liquid outlet is horizontally spaced at least about 1.25 D from said feed inlet.

8. The process of claim 1, wherein said liquid outlet is vertically spaced in the range of from about 0.2 D to about 1 D below said feed inlet.

9. The process of claim 1, wherein said disengagement vessel defines a vapor outlet for discharging at least a portion of said vapor, wherein said vapor outlet is horizontally spaced at least about 1.25 D from said feed inlet.

10. The process of claim 1, wherein said heat exchanger comprises a shell and a plurality of tubes disposed within said shell, wherein said shell is elongated along a central axis of elongation that extends within 30 degrees of vertical.

11. The process of claim 1, wherein said disengagement vessel is elongated along a central axis of elongation that extends within 30 degrees of horizontal.

12. The process of claim 1, wherein said heated reaction medium forms foam in said heat exchanger and/or in said disengagement vessel.

13. The process of claim 12, wherein said heated reaction medium comprises a foam portion and a predominately liquid portion, wherein substantially none of said foam portion exits said disengagement vessel.

14. The process of claim 1, wherein said heated reaction medium comprises a predominately liquid portion, wherein the maximum depth of said predominately liquid portion in said disengagement vessel is less than about 0.6 D.

15. The process of claim 1, wherein the average chain length of said PET in said predominately liquid product is at least about 2 greater than the average chain length of said initial reaction medium introduced into said heat exchanger.

16. The process of claim 15, wherein the PET in said initial reaction medium introduced into said heat exchanger has an average chain length in the range of from about 1 to about 20.

17. The process of claim 16, wherein the temperature of said heated reaction medium introduced into said disengagement vessel is maintained in the range of from about 220 to about 350° C., wherein the vapor space pressure in said disengagement vessel is maintained in the range of from about 0 to about 300 torr.

18. The process of claim 1, wherein the average chain length of said PET in said predominately liquid product is at least about 10 greater than the average chain length of said PET in said initial reaction medium introduced into said heat exchanger.

19. The process of claim 18, wherein said PET in said initial reaction medium introduced into said heat exchanger has an average chain length in the range of from about 5 to about 50.

20. The process of claim 19, wherein the temperature of said heated reaction medium introduced into said disengagement vessel is maintained in the range of from about 220 to about 350° C., wherein the vapor space pressure in said disengagement vessel is maintained in the range of from about 0 to about 30 torr.

21. The process of claim 1, wherein said PET is a PET copolymer comprising at least about 90 mole percent ethylene terephthalate repeat units and up to about 10 mole percent of added comonomer repeat units.

22. The process of claim 21, wherein said added comonomer repeat units are derived from an added comonomer selected from the group consisting of isophthalic acid, 2,6-naphthaline-dicarboxylic acid, 1,4-cyclohexane-dimethanol, diethylene glycol, and combinations of two or more thereof.

23. The process of claim 22, wherein said added comonomer comprises isophthalic acid.

24. The process of claim 7, wherein said PET in said predominantly liquid product discharges from said disengagement vessel at a rate of at least about 10,000 pounds per hour.

25. The process of claim 1, wherein neither said heat exchanger nor said disengagement vessel comprises a mechanical mixing device.

26. The process of claim 1, further comprising, heating said heated reaction medium in said disengagement vessel, wherein less than 50 percent of said heating in said disengagement vessel is provided by internal heat exchange tubes or coils.

27. The process of claim 1, further comprising, agitating said heated reaction medium in said disengagement vessel, wherein less than 50 percent of said agitating is provided by mechanical agitation.

28. A polycondensation process comprising: (a) heating an initial reaction medium in a heat exchanger to thereby provide a heated reaction medium, wherein said initial reaction medium comprises PET; and (b) disengaging a vapor from said heated reaction medium in a horizontally elongated disengagement vessel to thereby provide a predominately liquid product, wherein at least a portion of said vapor is a byproduct of a polycondensation reaction carried out in said heat exchanger and/or in said disengagement vessel, wherein said disengagement vessel has a length-to-diameter (L:D) ratio in the range of from about 1.25:1 to about 8:1, and wherein said disengagement vessel is directly coupled to said heat exchanger.

29. The polycondensation process of claim 28, wherein the average chain length of said PET in said initial reaction medium introduced into said heat exchanger is in the range of from about 1 to about 20, wherein the average chain length of said PET in said predominately liquid product is at least about 2 greater than the average chain length of said PET in said initial reaction medium introduced into said heat exchanger.

30. The polycondensation process of claim 28, wherein the temperature of said heated reaction medium exiting said heat exchanger is in the range of from about 220 to about 350° C., wherein the vapor space pressure in said disengagement vessel is maintained in the range of from about 0 to about 300 torr.

31. The polycondensation process of claim 28, wherein said disengagement vessel is spaced less than 5 D from said heat exchanger.

32. The polycondensation process of claim 28, wherein said initial reaction medium flows upwardly through a plurality of substantially vertical tubes of said heat exchanger during said heating.

33. The polycondensation process of claim 28, wherein said disengagement vessel comprises a substantially horizontal pipe and a pair of end caps coupled to opposite ends of said pipe.

34. The polycondensation process of claim 28, wherein said disengagement vessel defines a feed inlet for receiving at least a portion of said heated reaction medium, a vapor outlet for discharging at least a portion of said vapor, and a liquid outlet for discharging at least a portion of said predominately liquid product, wherein said liquid outlet is horizontally spaced at least about 1.25 D from said feed inlet, wherein said vapor outlet is horizontally spaced at least about 1.25 D from said feed inlet.

35. The polycondensation process of claim 28, wherein said heated reaction medium comprises a predominately liquid portion, wherein the maximum depth of said predominately liquid portion in said disengagement vessel is less than about 0.6 D.

36. A reactor system comprising: an upright heat exchanger and a horizontally elongated disengagement vessel, wherein said heat exchanger defines an exchanger inlet and an exchanger outlet, wherein said disengagement vessel defines a feed inlet, a vapor outlet, and a liquid outlet, wherein said feed inlet is coupled in fluid communication with said exchanger outlet, wherein said disengagement vessel has a length-to-diameter (L:D) ratio in the range of from about 1.25:1 to about 8:1, wherein said liquid outlet is horizontally spaced at least about 1.25 D from said feed inlet, wherein said liquid outlet is vertically spaced less than about 2 D from said feed inlet and wherein said disengagement vessel is directly coupled to said heat exchanger.

37. The system of claim 36, wherein said feed inlet is spaced less than 5 D from said liquid outlet.

38. The system of claim 36, wherein said exchanger outlet is located at a higher elevation than said exchanger inlet.

39. The system of claim 38, wherein said heat exchanger comprises a plurality of substantially vertical tubes, wherein said heat exchanger is operable to heat a fluid flowing upwardly through said tubes.

40. The system of claim 36, wherein said liquid outlet is vertically spaced in the range of from about 0.2 D to about 1 D below said feed inlet.

41. The system of claim 36, wherein said disengagement vessel comprises a substantially straight, substantially horizontal pipe and a pair of end caps coupled to opposite ends of said pipe.

42. The system of claim 41, wherein one of said end caps defines said feed inlet.

43. The system of claim 41, wherein said liquid outlet is located near the bottom of said pipe, wherein said vapor outlet is located near the top of said pipe.

44. The system of claim 41, wherein said disengagement vessel comprises a downwardly extending baffle located between said feed inlet and said vapor outlet, wherein said baffle is located closer to said vapor outlet than to said feed inlet.

45. The system of claim 41, wherein said L:D ratio is in the range of from about 1.5:1 to about 6:1.

46. The system of claim 41, wherein said reactor system does not comprise any mechanical mixing devices.

47. The system of claim 36, wherein said disengagement vessel does not comprise any internal heat exchange tubes.

48. The process of claim 1, wherein the It.V. of said PET in said predominantly liquid product is in the range of from about 0.1 to about 0.5 dL/g.

49. The process of claim 1, wherein the It.V. of said PET in said predominantly liquid product is in the range of from about 0.3 to about 1.2 dL/g.

50. The process of claim 19, wherein the It.V. of said PET in said predominantly liquid product is in the range of from about 0.3 to about 1.2 dL/g.

51. The process of claim 16, wherein the It.V. of said PET in said predominantly liquid product is in the range of from 0.1 and 0.5 dL/g.

52. The process of claim 29, wherein the It.V. of said PET in said predominantly liquid product is in the range of from 0.1 to 0.5 dL/g.

\* \* \* \* \*